Nov. 25, 1952     M. S. CLOUGH     2,618,852
PIE TOP CUTTER
Filed Aug. 6, 1947
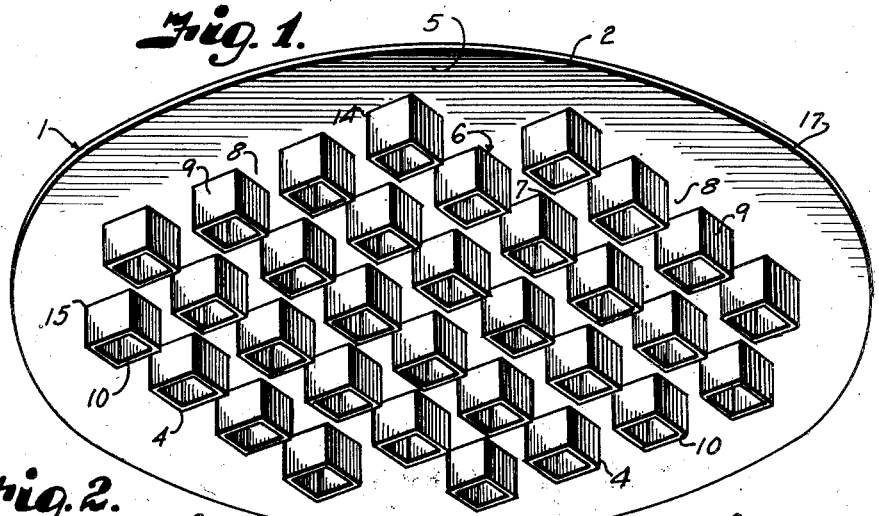
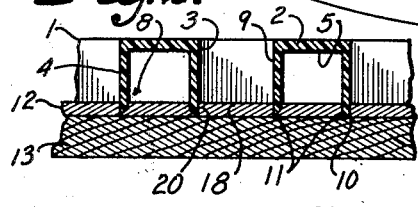
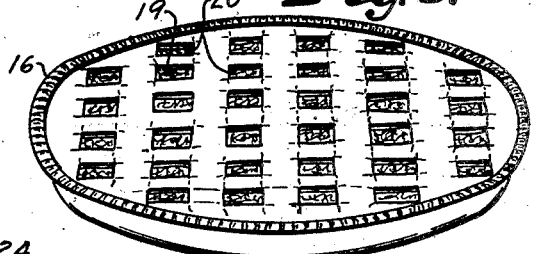
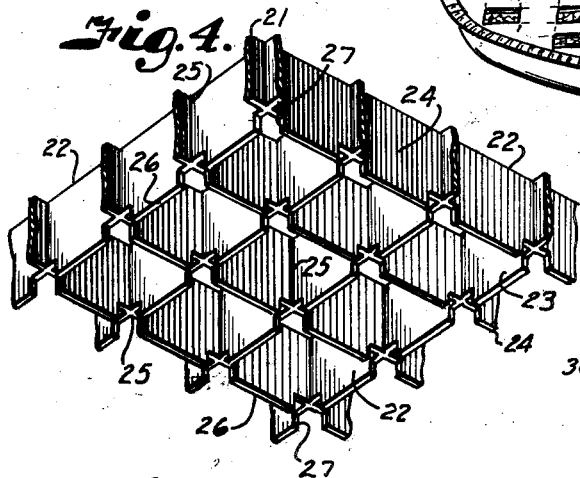
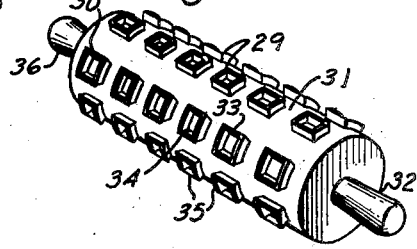
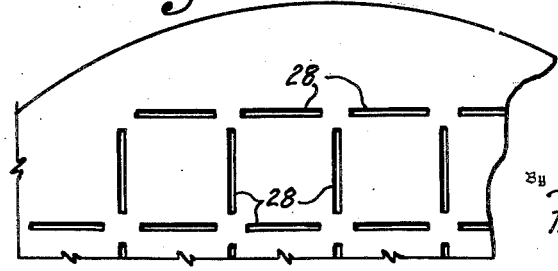
Inventor
Minnie S. Clough
By Fishburn & Mullendore
Attorneys Patented Nov. 25, 1952

2,618,852

UNITED STATES PATENT OFFICE 2,618,852

PIE TOP CUTTER

Minnie S. Clough, Kansas City, Mo.

Application August 6, 1947, Serial No. 766,683

3 Claims. (Cl. 30—299)

This invention relates to a device for cutting dough and more particularly to such a device for cutting pie tops for forming a design therein. It has been the custom in making covered pies to form several holes in the top thereof through which the steam and gases generated in the baking operation escape. Various designs have been cut in the pie tops for enhancing the appearance of the finished pie, but it is recognized the most attractive pies are those covered by strips of dough laced to form a latticed type top. The lattice effect requires much time, care and patience and such pies are, therefore, made only on special occasions.

The objects of the present invention are to provide a device for cutting dough for pie tops, forming a lattice appearance therein with a saving of dough; to provide a cutting device wherein a set of cutters is formed integrally with a yieldable base or pressure plate whereby cutting pressure may be concentrated in selected portions of the device; to provide a device for making a plurality of aligned cuts in a pie top; to provide a device for rapidly cutting a pattern in a pie top with a minimum of effort and one simple motion to form an attractive pie top permitting view of the contents; and to provide a simple, sanitary device for cutting pie tops.

In accomplishing these and other objects of the present invention, I have provided improved details of structure, the preferred forms of which are illustrated in the accompanying drawing, wherein:

Fig. 1 is a perspective view of a dough cutter embodying the features of the present invention.

Fig. 2 is a detail sectional view through the pressure plate and cutter thereon.

Fig. 3 is a perspective view of a pie having a top such as is cut by the cutter illustrated in Fig. 1.

Fig. 4 is a detail perspective view of a portion of a modified form of pie cutter.

Fig. 5 is a partial plan view of a pie top illustrating the cut formed by the cutter illustrated in Fig. 4.

Fig. 6 is a further modified form of cutter arranged in the form of a rolling pin.

Referring more in detail to the drawings:

1 designates a dough cutter consisting of a disk-shaped, flat pressure plate 2 preferably formed of plastic, metal or other suitable yieldable material and preferably having a plurality of perforations 3 therein. Formed integrally with the plate 2, or suitably attached thereto, are cutting elements 4 surrounding the perforations 3 and depending from the under side 5 of said pressure plate 2.

In the form of the invention illustrated in Figs. 1 and 2, the perforations and cutting elements are of square contour and arranged in parallel rows 6 and 7, with each of said cutting elements 4 being spaced as at 8 a distance substantially equal to the width of each of the side walls 9 of said cutting elements. Said walls 9 are preferably thin and the bottom edges 10 thereof may be sharpened by beveling same upwardly and inwardly as at 11, Fig. 2, whereby a sharp cutting edge is provided at the lower outer edge of each of the walls 9 and said cutting edges correspond to the outer periphery of the cutting elements 4. With this arrangement of the cutting elements, each element forms a square tubular member, depending from the pressure plate 2 and the lower edges 10 of each of said cutting elements are in a common plane whereby said elements when pressed through a piece of dough 12 rolled to the desired thickness, the bottom edges of the cutting elements will cut through the dough to the support 13 thereof.

The pressure plate 2 preferably is relatively rigid, but it is desirable that there be some flexibility in said plate whereby the plate will bend slightly when being pressed through the dough to provide a shear action thereon in cutting a pie top.

The cutting elements may be arranged as desired on the pressure plate, however for cutting pie tops for round pies it is desirable that the outer rows 14 and 15 contain less cutting elements than the adjacent inner rows, thereby adapting the cutter more nearly to a round shape and provide substantially a lattice or stripped appearance to the pie top.

In using a pie top cutter such as shown in Figs. 1 and 2 for forming a pie top such as illustrated on the pie shown in Fig. 3, dough is worked to the desired consistency and placed on a suitable board or other support 13 and rolled or otherwise flattened to a desired thickness to form the piece of dough 12 of sufficient diameter to cover the pie and extend over the edges of the pan therefor, whereby the peripheral marginal edge 16 may be suitably crimped to completely seal the edges of the respective members of the pie.

When a suitable piece of dough 12 is formed the pie cutter 1 is placed thereon with the peripheral edge 17 so arranged relative to the edges of the piece of dough 12 whereby the dough edges will extend outwardly relative to the edges 17 of the pressure plate. Pressure is then applied to the upper face of the pressure plate to move same downwardly through the dough into engagement with the board or other supporting surface 13. The preferred method of applying pressure to the pressure plate is by means of a rolling pin placed on said pressure plate adjacent one edge thereof, the user then applying pressure to the handles of said rolling pin and rolling same across the top of the pressure plate. This method applies substantially a line pressure across the pressure plate and progressively forces the cutting elements through the pie dough. The slight flexibility of the pressure plate effects a slight bending action therein whereby the cutting elements under the rolling pin are progressively moved through the dough due to the concentrated pressure applied by said rolling pin. This action reduces the amount of pressure required for forcing the cutting elements through the dough. When the cutting elements have all been forced through the pie dough the operator may place his finger tips under the edge of the pressure plate and lift upwardly to remove the pie top cutter from the dough. The pie top may then be picked up in the conventional manner as by lifting one edge and progressively lifting the pie top from the board 13, the portions 18 of the shape of the cutting elements remaining on the board. The pie top 12 is then placed on the remainder of the pie and the peripheral edges crimped and trimmed as illustrated in Fig. 3. This provides a pie top wherein the filling material 19 is visible through the openings 20 and the portions between the rows of openings are arranged substantially as in a pie top formed by laced strips.

In the form of the invention illustrated in Figs. 4 and 5, the cutter 21 consists of a plurality of bar members 22 molded integrally or otherwise suitably secured to form a grid structure having relatively thin walls 23, said walls being a portion of the bars 22, which are arranged in spaced parallel relation, intersecting a plurality of spaced, parallel bars 24 arranged perpendicular to the bars 22, the respective bars intersecting as at 25. The lower edge 26 of the bars forms cutting edges and may be sharpened if desired to provide a plurality of spaced, aligned cuts. A portion of the lower edge 26 adjacent the point of intersection of the respective bars is cut out as at 27, whereby the cutting edge of each wall 23 between the bars is arranged perpendicular thereto and is substantially shorter than the spacing between the adjacent bars.

In using a device constructed as described, the dough is formed and the cutter placed thereon and forced through the dough substantially as described relative to the device shown in Figs. 1 and 2. After the cutter is forced through the dough, said cutter is removed therefrom leaving spaced, aligned cuts 28 as illustrated in Fig. 5.

In the form of the invention illustrated in Fig. 6, a plurality of cutting elements 29 are arranged in aligned rows 30, longitudinally of and projecting outwardly relative to the surface 31 of a rolling pin 32, the individual cutting elements 29 of the respective rows being spaced on said surface to provide circumferentially aligned elements and longitudinally aligned elements, each spaced from the other substantially the same distance as the length of a side wall 33 of said cutting elements. The cutting elements are preferably formed of thin walls to provide an aperture 34 in each of said cutting elements, said walls projecting outwardly from the surface 31, whereby the outer edge 35 of the cutting elements lie all substantially in a cylindrical shape. The rolling pin is provided with conventional handles 36 for applying pressure to cut the dough.

In using a device as shown in Fig. 6, a pie top is rolled as described in the use of the device illustrated in Figs. 1 and 2 and when the dough is of the desired thickness, the cutter is placed thereon and rolled over the pie top, pressure being applied to the handles 36 to force the respective cutting elements 29 through the dough, forming a pie top substantially as shown in Fig. 3, each of the cutting elements forming an aperture 20 therein.

It is believed obvious that I have provided a pie top cutter for rapidly cutting a pattern in a pie top to form a latticed appearance on said pie, said device being simple in structure and easily maintained in sanitary condition.

What I claim and desire to secure by Letters Patent is:

1. A device for cutting a sheet of dough to form a latticework pie top crust comprising, a flat pressure member having a plurality of equally spaced aligned apertures arranged in relatively parallel and perpendicular rows, and cutting elements having walls around and coinciding with the edges of the respective apertures and projecting from the pressure member in substantially perpendicular relation thereto, said walls having inwardly and upwardly beveled outer ends providing sharp cutting edges substantially in the same plane and conforming to the outer peripheries of the cutting elements for cutting spaced openings in the dough of a pie top in response to pressure on said pressure member, said cutting elements each being spaced from the others to provide connected channels therebetween for the formation of lattice strips between the openings cut in the sheet of dough whereby said lattice strips constitute the pie top.

2. A device for cutting a sheet of dough to form a latticework pie top crust comprising, a flat yieldable pressure member, a plurality of outwardly projecting tubular members on said pressure member, said tubular members having walls of substantially uniform thickness defining a plurality of equally spaced aligned polygonal-shaped openings which extend through the pressure member, and inwardly and upwardly edges on the ends of said tubular members providing cutting edges conforming to the outer peripheries of the cutting elements for cutting spaced openings in the dough of a pie top in response to pressure on the pressure member, all of said cutting edges being in the same plane, said tubular members each being spaced from the adjacent tubular members to provide connected channels therebetween for the formation of lattice strips between the openings cut in the sheet of dough.

3. A device for cutting a sheet of dough to form a latticework pie top crust comprising, a flat disk of relatively flexible material, and a plurality of spaced aligned hollow substantially square cutting elements integral with and projecting outwardly from one face of said disk, said cutting elements having relatively thin walls defining openings extending through the cutting elements and disk, said cutting elements being arranged in relatively parallel and perpendicular rows with walls of the elements in one row parallel to the corresponding walls of the elements in adjacent rows and each cutting element spaced from the others to provide connected channels therebetween, said cutting elements being of substantially the same width as the spacing therebetween and having inwardly and upwardly beveled outer ends providing cutting edges equi-distant from said disk and conforming to the outer peripheries of the cutting elements for cutting spaced openings in the dough of a pie top in response to pressure on said disk at selected points thereof whereby the portions of the dough between the openings conform to the connected channels between the cutting elements and form lattice strips which constitute the pie top.

MINNIE S. CLOUGH.

REFERENCES CITED

The following references are of record in the file of this patent:

UNITED STATES PATENTS

| Number | Name | Date |
|---|---|---|
| 25,767 | Shorte | Oct. 11, 1859 |
| 337,329 | Hewett | Mar. 2, 1886 |
| 496,809 | Allen | May 2, 1893 |
| 1,267,478 | Thomas | May 28, 1918 |
| 1,299,802 | Smith | Apr. 8, 1919 |
| 1,979,199 | Haynes | Oct. 30, 1934 |
| 2,453,599 | Schlegel | Nov. 9, 1948 |
| 2,526,811 | Dawson | Oct. 24, 1950 |